(12) United States Patent
Bennett et al.

(10) Patent No.: US 6,285,956 B1
(45) Date of Patent: *Sep. 4, 2001

(54) MARINE SEISMIC TOW SYSTEM

(75) Inventors: Colin Bennett, Houston; Loran D. Ambs, Fulshear, both of TX (US)

(73) Assignee: WesternGeco, LLC, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,506

(22) Filed: May 3, 1999

Related U.S. Application Data

(63) Continuation-in-part of application No. 09/000,769, filed on Dec. 30, 1997, now Pat. No. 6,028,817.

(51) Int. Cl.[7] ....................................................... G01V 1/38
(52) U.S. Cl. .................................. 702/14; 367/16; 367/20
(58) Field of Search ................................ 702/14; 367/20, 367/16, 19, 106, 130; 114/248, 244, 245, 246, 253, 254; 181/111, 112, 110

(56) References Cited

U.S. PATENT DOCUMENTS

| | | | |
|---|---|---|---|
| 3,806,863 | 4/1974 | Tilley et al. | 340/7 |
| 4,669,067 | * 5/1987 | Roberts | 367/19 |
| 4,729,333 | * 3/1988 | Kirby et al. | 114/244 |
| 5,052,814 | * 10/1991 | Stubblefield | 367/16 |
| 5,682,357 | * 10/1997 | Rigsby | 367/15 |
| 5,757,725 | * 5/1998 | Wilson et al. | 367/130 |
| 5,913,280 | * 6/1999 | Nielsen et al. | 367/16 |
| 6,028,817 | * 2/2000 | Ambs | 367/16 |

FOREIGN PATENT DOCUMENTS

| | | |
|---|---|---|
| 0 154 968 A2 | 9/1985 | (EP) . |
| 0 188 928 A1 | 7/1986 | (FR) . |
| WO 99/12055 | 3/1999 | (WO) . |

* cited by examiner

*Primary Examiner*—Donald E. McElheny, Jr.
(74) *Attorney, Agent, or Firm*—Madan, Mossman & Sriram, PC

(57) ABSTRACT

A method for moving seismic streamers or acoustic energy sources through water in marine geophysical operations. The equipment can be deployed or retrieved from one or more vessels, and two or more tow vehicles maneuver seismic streamers through the water independently of a seismic vessel. Manned or unmanned tow vehicles can tow the streamers ahead of, behind, or to the side of a seismic vessel, or can form an array independent of the seismic vessel. Tow vehicles can be located at both ends to change the tow direction. The invention is particularly useful in customizing an array configuration, in reorienting the array at the end of each survey line, and permits deployment of receivers and sources in different combinations. By decoupling the tow vehicles and streamers from the source vessel, turning time at the survey region borders and the possibility of streamer entanglement is significantly reduced.

13 Claims, 4 Drawing Sheets

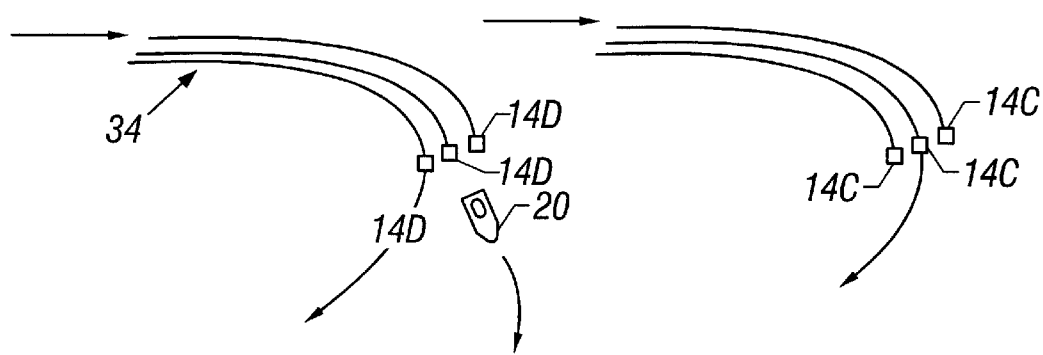
FIG. 7
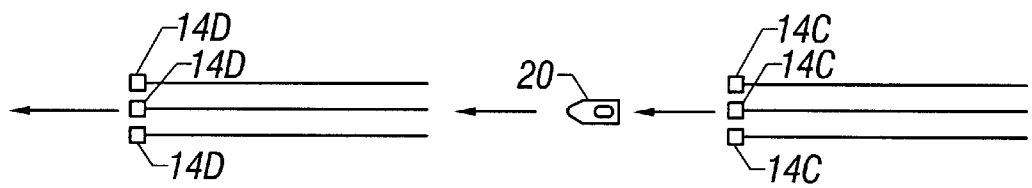
FIG. 8
FIG. 9
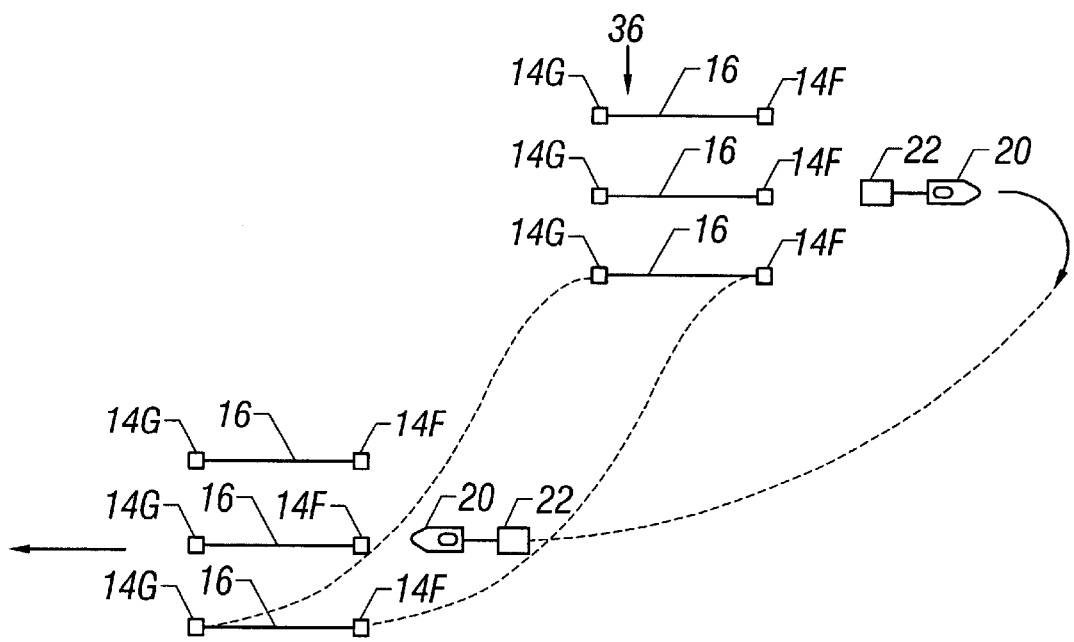
FIG. 10

MARINE SEISMIC TOW SYSTEM

This application is a continuation-in-part of and claims priority of U.S. patent application Ser. No. 09/000,769, now U.S. Pat. No. 6,028,817, entitled "Marine Seismic System With Independently Powered Tow Vehicle" which was filed on Dec. 30, 1997 and issued on Feb. 22, 2000.

BACKGROUND OF THE INVENTION

The present invention relates to the field of marine seismic exploration. More particularly, the invention relates to an improved system for maneuvering streamers and acoustic energy sources through water in marine seismic operations.

Marine seismic exploration investigates the structure and character of subsurface geologic formations underlying a body of water. For large survey areas, seismic vessels tow one or more seismic sources and multiple seismic streamer cables through the water. The seismic sources typically comprise compressed air guns for generating an acoustic pulse in the water. The energy from such pulse propagates downwardly into the geologic formations and is reflected upwardly from the interfaces between subsurface geological formations. The reflected energy is sensed with hydrophones attached to the seismic streamers, and data representing such energy is recorded and processed.

Three dimensional ("3-D") seismic surveys provide more information regarding the subsurface formations than two dimensional seismic surveys. 3-D surveys may be conducted with up to twelve or more streamers which form an array covering a large area behind the vessel. The streamers typically vary in length between three and twelve kilometers. Tail buoys attached at the streamer distal ends carry radar reflectors, navigation equipment, and acoustic transponders. Hydrophones are positioned along each streamer and are wired together in receiver groups spaced along each streamer. The in-line interval between receiver groups ranges between 5 and 25 meters, with 12.5 meters comprising a typical interval spacing.

A multiple streamer array requires diverters near the vessel to pull the streamers outwardly from the direct path behind the seismic vessel and to maintain the cross-line spacing between individual streamers. Diverters rely on hydrodynamic lift created by forward motion through the water to pull the streamers outwardly and to maintain the transverse position relative to the vessel path. If forward motion changes due to ocean currents and other environmental factors, the diverters will not maintain the optimum streamer orientation.

In-line spacing between receiver groups, and cross-line spacing between streamers, is critical to the efficient collection and analysis of geophysical data. Consistency in the orientation of seismic assets affects imaging of the subsurface. For example, surface sampling of receiver groups affects accurate detection of the reflected seismic signals and the "noise" interfering with such signals. Closer receiver group or streamer spacing will increase the accuracy of acoustic wavefield represented by the recorded data, while wider spacing between streamers permits a larger area to be surveyed for each seismic vessel pass.

The deployment, operation, and retrieval of multiple streamers requires handling and time. Each day on prospect is expensive and significantly increases survey costs. The streamers are carried by the seismic vessel and are deployed into the water after the survey site has been reached. At the end of each survey line, the vessel turns around and charts the next pass. Vessel turns are complicated by the long streamers extending behind the vessel, and the turning radius is typically large to minimize the possibility of streamer entanglement. When the survey is complete, the streamers are reeled onto the vessel deck for relocation to the next survey site.

Multiple vessel configurations can collect certain information not available from a single seismic vessel, such as when an obstruction blocks passage of a single seismic vessel. One technique involves "undershooting" of obstructions. A primary vessel and receiver spread sails on one side of an obstruction, and a secondary vessel towing the energy source sails on the other side of the obstruction. Subsurface coverage underneath the obstruction is obtained between the two offset vessels. Because both vessels are sailing in the same direction, subsurface coverage is offset in the transverse or cross-line direction relative to the receiver spread, and fold is acquired in the in-line direction only. Another multiple vessel technique uses a secondary vessel to acquire offset information exceeding the streamer length. The secondary vessel is offset from the receiver spread in the in-line direction ahead of the primary vessel or behind the tail end of the receiver spread. Both vessels sail in the same direction, resulting in in-line fold build-up.

Another geophysical exploration technique known as "zig-zag shooting" is a hybrid of conventional streamer methods combined with zig-zag shooting geometry. A "master" vessel tows several streamers and seismic sources in a conventional parallel path, and a second "slave" vessel provides a secondary source while sailing a continuous 45 degree reversing angle route. The sources generate acoustic energy in alternating modes between the two vessels. Because conventional streamer data having energy sources and streamers with a single vessel is collected simultaneously, the cross-line separation cannot be altered during data acquisition. The resulting seismic data attributes represent a mixture of back azimuth zig-zag (patch) shooting and forward azimuth conventional in-line (swath) shooting.

In addition to the deployment and operation difficulties associated with towing multiple streamers, conventional techniques limit the ability to position source equipment and receivers in different relative positions and orientations. Because the sources and receivers are towed behind the same seismic vessel, array design is inherently limited by the tow configuration. Each towed array is also subject to cross-currents, wind, waves, shallow water, and navigation obstacles which limit the coverage provided by the survey system. Conventional tow systems experience significant drag and lead-in sag which require additional tow force to overcome. The large forces experienced by constituent components of conventional tow configurations sometimes exceed the mechanical limits of the components.

Accordingly, a need exists for an improved technique for conducting marine seismic operations. The technique should be economic, flexible and extensible. Additionally, the technique should facilitate repair without disrupting geophysical operations and permit various streamer and source geometric configurations to be implemented.

SUMMARY OF THE INVENTION

The invention provides an improved method for maneuvering seismic cables through water in marine seismic operations. The method comprises the steps of positioning a vessel at a selected location in the water, of deploying a cable in the water at a selected position relative to the vessel wherein a first end of the cable is attached to a separate tow means capable of independent movement through the water, and of operating each tow means to move the cable first end in a selected direction through the water.

In different embodiments of the invention, a tow means can move a cable in advance of the vessel, to the side of the vessel, or behind the vessel. At least three tow means can be positioned at the same distance from an acoustic energy source to provide equal source to receiver near-offset. A secondary tow means can be attached to a second end of each cable, and the secondary tow means can move the cable transversely in the water or opposite the original tow course provided by the primary tow means. A controller can operate from the vessel to control movement of multiple tow means, and at least one of the tow means can move an acoustic energy source through the water.

BRIEF DESCRIPTION OF THE DRAWINGS

FIGS. 7 and 8 illustrates a turning procedure for reducing the line change time.

FIGS. 9 and 10 illustrate an array having tow vehicles located at both streamer ends for lateral movement and reverse operation of the streamers.

DESCRIPTION OF THE PREFERRED EMBODIMENTS

The invention provides new marine surveying methodology having the design flexibility unattainable with a conventional multi-streamer seismic ship. The invention accomplishes this function by fully decoupling the acoustic energy sources from the receivers so that movement of the sources and receivers is independent. One or more tow vehicles each move an acoustic energy source or seismic streamer in a selected array to lead, follow, or operate independently of a seismic vessel. The invention provides flexibility in cross-line and in-line spacing by providing cooperative operation of manned and unmanned tow vehicles and other vessels. The invention also provides unique techniques for deploying and recovering multiple, independently powered seismic assets from a host vessel and for maneuvering manned or unmanned seismic assets during marine seismic operations.

The preferred method of implementing the invention involves one or more streamer cables towed by a separate tow vehicle, together with at-least one acoustic energy source for generating seismic signals. Each cable can incorporate one or more seismic assets such as a marine streamer or energy source. To improve the data acquired during each swath, multiple tow vehicles provide desired survey geometry as described below. The vessels can be manned (such as conventional seismic or offshore supply boats) or unmanned (such as remotely operated vehicles). The source vessels and streamer vessels can comprise surface boats for travel on the water surface or can be submersible for traveling below the water surface.

Figure 1:
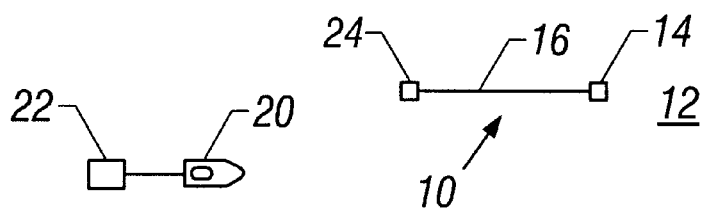
FIG. 1 illustrates multiple tow vehicles for moving streamers independently of a seismic vessel.

FIG. 1 illustrates marine seismic system 10 in water 12 wherein two independent tow vehicles 14 are illustrated. Although, two tow vehicles are illustrated, the invention is applicable to a single tow vehicle and single cable, particularly in areas requiring a high degree of manueverability. Tow vehicles 14 each tow single cables or streamers 16 in a substantially similar direction which collectively form streamer spread 18. Streamers 16 can comprise a wire, cable, or multiple conductor member capable of providing structural connection, power transmission, or signal transmission between tow vehicles 14 and hydrophones, recorders, telemetry equipment, or other seismic assets or equipment connected to streamers 16. As defined herein, "streamer 16" can also comprise a cable or wire for towing an acoustic energy source or other seismic assets. Source vessel 20 deploys an associated acoustic energy source 22 for generating a seismic signal in the water, and can be used to transport tow vehicles 14 and associated streamers 16 to the selected survey region for deployment. Source vessel 20 can remain stationary in water 12 after tow vehicles 14 are deployed, can move in an in-line direction with tow vehicles 14, or can move in a direction different from the movement of tow vehicles 14.

The direction of travel for tow vehicles 14 in FIG. 1 is shown from left to right. Source vessel 20 can comprise a tow vehicle similar to tow vehicles 14 as vessel 20 remains stationary in water 12 or moves in a direction different than the in-line direction of tow vehicles 14. Tail buoys 24 are attached to a second end of each streamer 16 for providing a base identifying the location of streamer 16. Tail buoys 24 can be powered or unpowered, or can include fins for steering the direction and movement of tail buoys 24 as tow vehicles move streamers 16 through water 12. As described below, a powered tail buoy 24 provides unique flexibility in maneuvering streamers 16 within different spread geometries.

Figure 2:
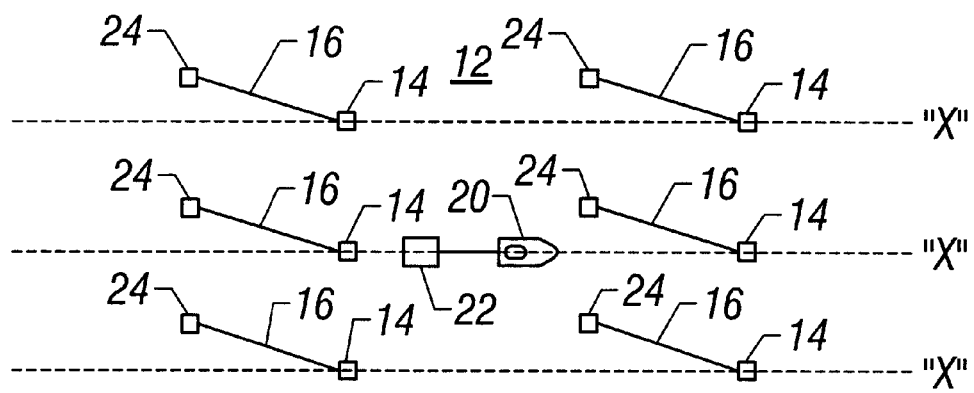
FIG. 2 illustrates tow vehicles and streamers fore and aft of an acoustic energy source.
Figure 3:
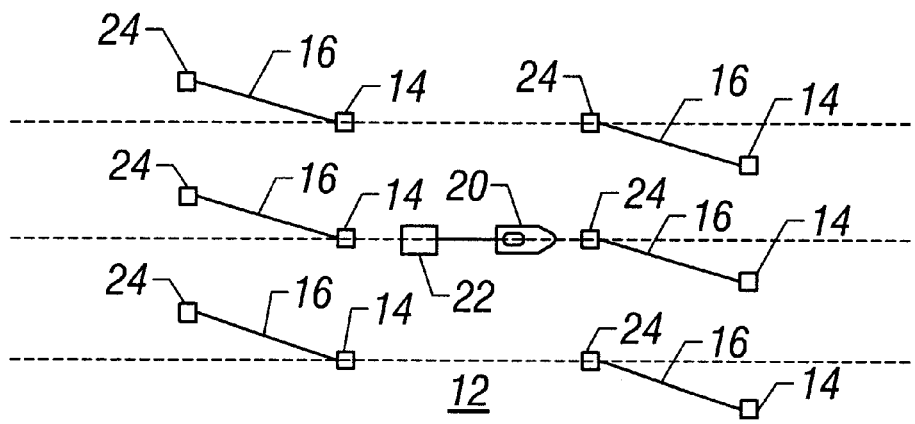
FIG. 3 illustrates an adjustment of selected tow vehicles to account for water cross-currents.

FIG. 2 illustrates another embodiment of the invention wherein tow vehicles 14 and attached streamers 16 are positioned fore and aft of vessel 20. As shown in FIG. 2, ocean currents or tidal streams can cause tail buoys 24 and streamers 16 to drift away from the intended path "X" illustrated in FIG. 2. Instead of lining all tow vehicles 14 in an in-line position relative to vessel 20, tow vehicles 14 could be positioned according to FIG. 3 to correct for streamer drift or to improve the subsurface coverage obtained during each seismic line.

Figure 4:
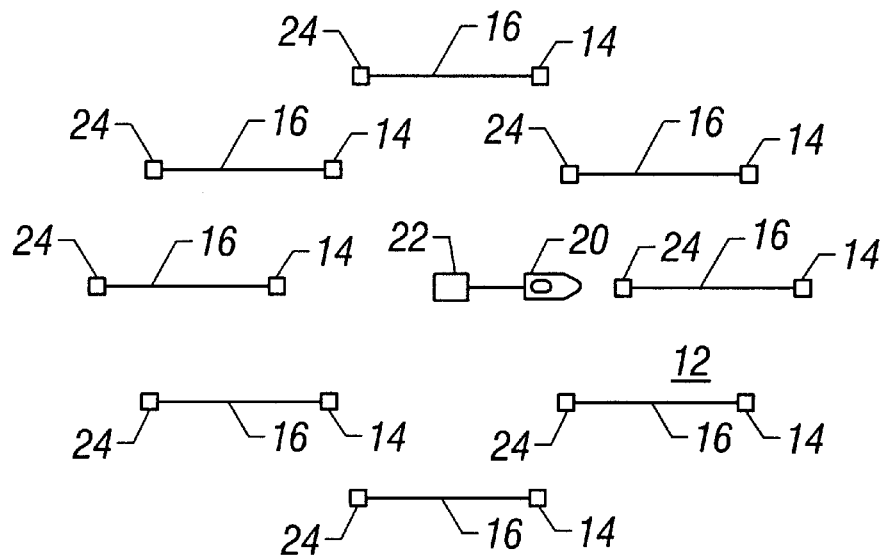
FIG. 4 illustrates an array surrounding an acoustic energy source.

FIG. 4 illustrates another embodiment of the invention wherein array 28 positions tow vehicles 14, streamers 16, and tail buoys 24 are located around acoustic energy source 22. In this configuration, receiver arrays attached to streamers 16 are positioned around acoustic energy source 22 for three hundred sixty degree source-to-receiver azimuth distribution over the full range of offsets.

Figure 5:
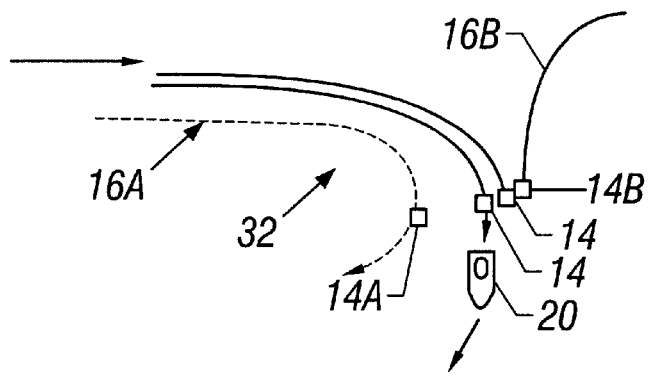
FIGS. 5 and 6 illustrate a turning procedure for an array wherein a streamer is replaced with another streamer.
Figure 6:
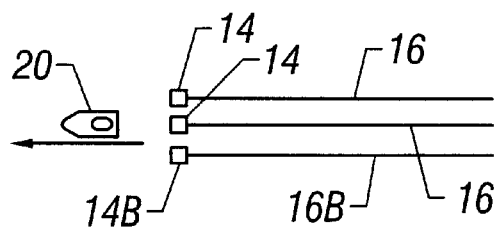

The invention provides significant flexibility for adding or removing equipment without significantly disrupting operations. By reducing the equipment downtime, significant time and cost savings can be accomplished. FIGS. 5 and 6 illustrates one embodiment of the invention wherein tow vehicles 14 in array 32 complete a turn at one end of a seismic survey region. Tow vehicle 14A is removed from array 32, tow vehicle 14B is maneuvered into the spread, and the spread is shifted to attain original spatial position. The beginning and ending orientation of array 32 is illustrated, and the substitution of a new replacement tow vehicle 14B can be accomplished while array 32 is stationary or moving through water 12. This latter capability significantly increases the efficiency of equipment replacement or repair because the replacement can be performed during a straight run of array 32 or can be performed as array 32 turns course at the end of the survey region when seismic data is typically not being collected.

FIG. 7 illustrates another embodiment of the invention wherein array 34 has tow vehicles 14C fore of vessel 20 and tow vehicles 14D aft of vessel 20. When a turn or change of course is made as shown in FIG. 8, source vessel 20 can invert the position relative to tow vehicles 14C and 14D, thereby reducing the turning distance traveled. This line change procedure can significantly reduce the turning time by thirty minutes for streamers having a length of 4800 meters. This time saving can significantly reduce the duration and cost of the entire survey.

FIG. 9 illustrates another embodiment of the invention wherein tow vehicles 14F and 14G are positioned at both ends of streamers 16 in array 36. Tow vehicles 14F initially operate to move streamers 16 along a selected course, and tow vehicles 14G provide no propulsion and act as tail buoys for streamers 16. To effect a line change, tow vehicles 14F and 14G are operated to move streamers 16 from the original course, and the direction of streamers 16 is reversed by operating tow vehicles 14G while changing tow vehicles 14F to operate as tailbuoys as shown in FIG. 10. Source vessel 20 changes position relative to array 36 and moves from the head to the tail of array 36. Alternatively, vessel 20 could move back to the head of array 36 if desired. By providing for push/pull capability of streamers 16, turning movement of array 36 is significantly reduced, thereby allowing array 36 to enter a constricted area such as a river estuary, harbor, or shallow water while significantly reducing the line change time required.

The number of streamers can be varied as desired, and at least two streamers are preferable to achieve cross-line fold. The number of acoustic energy sources can be varied as desired, and one, two or more sources can achieve split-spread recording.

In other embodiments of the invention, the streamer vessels do not have to be aligned and can be staggered in the in-line direction. The length of streamers can be modified, and can comprise the same or different lengths. The spacing between streamers is easily modified by the configuration of different vessels, however a single manned or unmanned streamer vessel could tow multiple streamers with conventional paravanes and other equipment.

Each source vessel may tow a single source array or multiples thereof and each tow vehicle may pull one or more streamers. Each vessel or vehicle is independent from the others in a preferred embodiment of the invention. Techniques for modifying the spacing of the two streamers can include remotely controlled paravanes and other control devices for varying the relative streamer offset as the seismic data acquisition system sails through the water.

The invention completely decouples the acoustic energy sources and receivers, permitting the flexibility to build cross-line fold with relatively widely or narrowly spaced streamers. Significantly, the invention permits the shooting pattern or receiving pattern to control the cross-line spacing.

Figure 11:
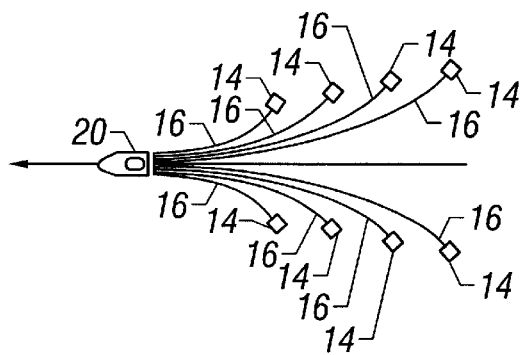
FIG. 11 illustrates deployment of multiple tow vessels moving in the same direction as a seismic source vessel.
Figure 12:
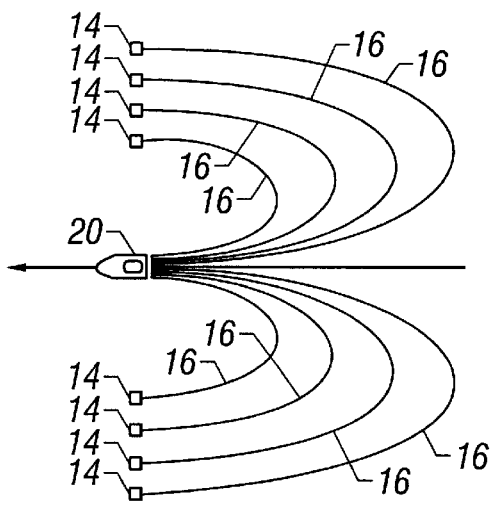
FIG. 12 illustrates deployment of multiple tow vehicles wherein one streamer end is attached to the seismic source vessel.
Figure 13:
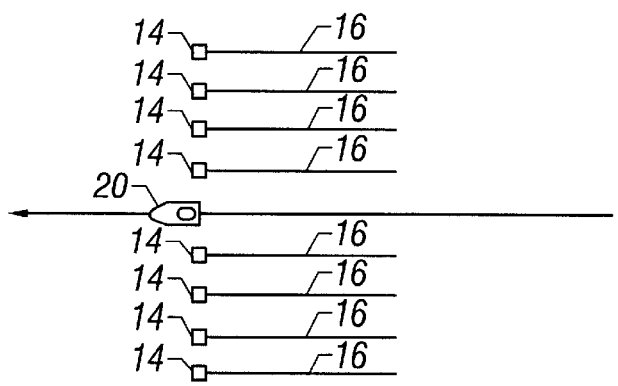
FIG. 13 illustrates multiple tow vehicles for maintaining a selected streamer array in water relative to the seismic source vessel.

The source and receiver lines can be extended to achieve a symmetric surface geometry where the in-line and cross-line dimensions of the subsurface coverage form a square, circle, oval, diamond, or other geometric or nonsymmetrical pattern. FIGS. 11–13 illustrates a deployment and operation of powered tow vehicles 14. As shown in FIG. 11, powered tow vehicles 14 and cables 16 are deployed in water 12 behind vessel 20, and tow vehicles 14 begin to move cables 16 outwardly. Tow vehicles 14 can deploy cables 16 while preventing entanglement as cables 16 are paid out in water 12 from vessel 20. FIG. 12 illustrates the movement of tow vehicles 14 in a line with vessel 20. The ends of cables 16 attached to vessel 20 are released into water 12 so that tow vehicles 14 can maneuver cables 16 as illustrated in FIG. 13. To recover cables 16 on board vessel 20, each tow vehicle 14 can independently move toward vessel 20 for retrieval of such tow vehicle 14 and the attached cable 16.

This embodiment of the invention simplifies the deployment and operation of multiple cables 16 and the seismic assets associated with each cable 16. The ability to achieve a symmetric acquisition footprint, where the in-line and cross-line dimensions of the subsurface coverage are equal, yields benefits regarding the uniformity of the offset and azimuth distribution of the collected data.

The invention significantly simplifies handling equipment because there is no need for cumbersome equipment such as paravanes, tow wires and their associated handling equipment. Conventional marine seismic operations are burdened by the complexity of a large number of interconnected components such as paravanes, tow wires, bend restrictors, tag lines, floats, lead-ins, and sliders. The coordinated deployment, maneuvering and retrieval of multiple vehicles towing a small subset of seismic assets reap efficiencies unobtainable with conventional multi-streamer seismic operations. For instance, the simplicity of configuring and deploying a single streamer per vehicle for multiple single streamer vehicles can require much less time than deployment of multiple streamers at the same time from a single vessel. Operating multiple single streamer vehicles also reduces the drag experienced by the collective seismic spread since there are no components such as tow wires or lead-ins being towed through the water at an angle to the direction of travel. Less drag results in less vessel fuel consumption. Damage to equipment such as lead-ins, stretch sections and active sections is reduced because of the reduced stresses associated with towing seismic assets only in the direction of travel. Crew exposure to hazards is reduced because of the absence of paravanes, paravane winches, and tensioned wire ropes.

By permitting deployment of multiple manned or unmanned tow vessels or tow means, the invention provides unique deployment and operating capability for seismic sources and streamers. Unique flexibility in seismic spread configuration is possible, thereby permitting unique data gathering operations which were not previously feasible. The invention facilitates wide-azimuth, split spread geometries resulting in improved subsurface illumination when compared to conventional streamer surveys. The invention further provides the ability to balance and equalize the distribution of subsurface data in the common shot, common receiver, common offset and common midpoint domains through selective balancing of inline and cross-line source and receiver effort.

The invention provides significant economic benefits over existing techniques because the huge towing capacity required for conventional multi-streamer seismic ships is eliminated. Wide swaths of data not achievable with conventional single ship operations can be acquired by using widely separated seismic assets where near offsets are not critical. Where near offset information is critical, the same assets could be dynamically reconfigured to concentrate large numbers of streamers in a narrower swath. Therefore, inexpensive unmanned vessels can serve as the streamer vessels or source vessels, and radio telemetry can economically transmit data from each vessel to a central recording vessel. The invention further provides the ability to economically acquire data with uniform in-line and cross-line bin dimensions.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A method for moving seismic cables through water, comprising:

positioning a source vessel at a first selected position in the water;

deploying a first seismic cable having a first end and a second end in the water at a second selected position relative to said source vessel, wherein the first end of said cable is attached to a primary powered tow vessel capable of independent movement relative to said source vessel through the water; and operating said primary powered tow vessel to move said cable first end in a selected first direction through the water while said second end is attached to a secondary powered tow vessel, said secondary powered tow vessel selectively providing no propulsion; and selectively operating said secondary powered tow vessel to maneuver the cable in the water in a second direction opposite the first direction.

2. The method as recited in claim 1, further comprising the step of operating said secondary powered tow vessel to control said cable second end as said primary powered tow vessel moves said cable first end through the water.

3. The method as recited in claim 1, further comprising the step of positioning said primary tow vessel to pull cable and travel in the selected first direction wherein said primary and secondary tow vessels are located aft of the source vessel.

4. The method as recited in claim 1, further comprising the step of positioning said secondary tow vessel to travel in the selected second direction wherein said primary and secondary tow vessels are located fore of the source vessel.

5. The method as recited in claim 1, wherein the primary powered tow vessel is not operated to provide propulsion at the same time as the secondary powered tow vessel provides propulsion, so that the primary powered tow vessel selectively pulls the cable and the secondary powered tow vessel through the water in a first direction, while the secondary powered tow vessel acts as a tail buoy and said secondary powered tow vessel selectively pulls said cable and primary powered tow vessel in a direction opposite to the course previously charted by said primary powered tow vessel and the primary vessel as the primary powered tow vessel acts as a tail buoy.

6. A method for moving seismic cable through water, comprising:

positioning a source vessel at a selected position in the water;

moving said source vessel in a selected course in a first direction through the water;

deploying a plurality of seismic assets in the water at selected position, wherein a first end of each seismic asset is attached to a separate primary powered tow vessel capable of independent movement through the water relative to movement of the source vessel;

operating each primary powered tow vessel to move each seismic asset in a selected course through the water;

controlling operation of each primary powered tow vessel to change the course of each seismic asset through the water, operating a plurality of secondary powered tow vessels each attached to a second end of each seismic asset to selectively control movement of each seismic asset second end through the water;

operating said primary and secondary tow vessels thereby reversing the travel direction of the seismic assets, whereby the primary and secondary tow vessels are operated so that when the primary tow vessel is operated, the primary tow vessel pulls the cable and the secondary tow vessel through the water in a first direction and when the secondary tow vessel is operated, the secondary tow vessel pulls the cable and the primary tow vessel through the water in a second direction.

7. The method of claim 6, wherein at least one primary powered tow vessel cable and associated secondary powered tow vessel travel in the water so that the primary powered tow vessel leads as the asset travels in the water, further comprising the step of operating said primary and secondary tow vessels whereby said secondary tow vessel leads as the asset travels through the water.

8. A marine seismic towing system for moving seismic cables through water, comprising:

a source vessel at a first selected position in the water;

a first seismic cable having a first end fore of the source vessel and a second end in the water at a second selected position relative to said source vessel, wherein the first end of said cable is attached to a primary powered tow vessel capable of independent movement relative to said source vessel through the water, wherein said primary powered tow vessel is attached to said cable to pull said first end in a selected first direction through the water while said second end is attached to a secondary powered tow vessel, wherein said secondary powered tow vessel selectively providing no propulsion; and said secondary powered tow vessel is selectively operable to maneuver the cable in the water in a second direction opposite the first direction.

9. The system as recited in claim 8, further comprising wherein said secondary powered tow vessel controls said cable second end as said primary powered tow vessel moves said cable first end through the water.

10. The system as recited in claim 8, wherein said primary tow vessel travel in the selected first direction wherein said primary and secondary tow vessels are located aft of the source vessel.

11. The system as recited in claim 8, wherein said secondary tow vessel travels in the selected second direction wherein said primary and secondary tow vessels are located fore of the source vessel.

12. The system as recited in claim 8, wherein the primary powered tow vessel is selectively operable so as not to provide propulsion at the same time as the secondary powered tow vessel provides propulsion, so that the primary powered tow vessel selectively pulls the cable and the secondary powered tow vessel through the water in a first direction, while the secondary powered tow vessel acts as a tail buoy and said secondary powered tow vessel selectively pulls said cable and primary powered tow vessel in a direction opposite to the course previously charted by said primary powered tow vessel and the primary vessel as the primary powered tow vessel acts as a tail buoy.

13. A system for moving seismic cable through water, comprising:

a source vessel at a selected positioned in the water, said source vessel moving in a selected course in a first direction through the water;

a plurality of seismic assets deployed in the water at a selected position, wherein a first end of each seismic asset is attached to a separate primary powered tow vessel capable of independent movement through the water relative to movement of the source vessel, wherein each primary powered tow vessel moves each seismic asset in a selected course through the water, wherein each primary powered tow vessel to change the course of each seismic asset through the water, operating a plurality of secondary powered tow vessels each attached to a second end of each seismic asset to selectively control movement of each seismic asset second end through the water; and said primary and secondary tow vessels capable of reversing the travel direction of the seismic assets, whereby the primary and secondary tow vessels are operable so that when the primary tow vessel is operated, the primary tow vessel pulls the cable and the secondary tow vessel through the water in a first direction and when the secondary tow vessel is operated, the secondary tow vessel pulls the cable and the primary tow vessel through the water in a second direction.

* * * * *